United States Patent [19]

Greenshields

[11] 3,917,853

[45] Nov. 4, 1975

[54] PRODUCTION OF EXTRACTS FROM CELLS

[75] Inventor: Roderick Norman Greenshields, Birmingham, England

[73] Assignee: Greenshields Inventions Limited, Birmingham, England

[22] Filed: Oct. 10, 1973

[21] Appl. No.: 405,121

Related U.S. Application Data

[63] Continuation-in-part of Ser. No. 137,654, April 26, 1971, abandoned.

[30] Foreign Application Priority Data

May 22, 1973 United Kingdom............. 24445/73

[52] U.S. Cl. ....................... 426/60; 426/212; 195/4
[51] Int. Cl.² ........................................... A23L 1/28
[58] Field of Search ............ 426/54, 60, 63; 195/29, 195/100, 81, 104, 105, 106; 260/112 R

[56] References Cited
UNITED STATES PATENTS

| 3,523,801 | 8/1970 | Shiga et al. ..................... 195/29 X |
| 3,778,513 | 12/1973 | Shiga et al. ..................... 426/60 X |

OTHER PUBLICATIONS

Dixon, et al., Enzymes, 2nd Ed., pp. 750–751, Academic Press, 1964.

Primary Examiner—A. Louis Monacell
Assistant Examiner—Esther L. Massung

[57] ABSTRACT

The invention provides a process for making an edible extract from Penicillium molds by causing lysis of the mold under acid conditions, separating the resulting extract from the gross solids, removing bitterness from the extract by rendering it non-acidic until the bitterness causing substance, namely phenylacetic acid, is caused to form a precipitate, and thereafter separating the precipitate from the extract.

9 Claims, No Drawings

PRODUCTION OF EXTRACTS FROM CELLS

This is a continuation in part of application Ser. No. 137 654, filed Apr. 26, 1971, now abandoned.

The present invention relates to the production of extracts from cells, and particularly, though not exclusively, to the production of edible extracts, the cells being those of the Penicillium moulds.

Large quantities of Penicillium moulds are grown commercially for the manufacture of penicillin antibiotics, the moulds producing penicillins or penicillin precursors as metabolites while they are grown. These metabolites are separated from the moulds and processed to provide the required antibiotics. The excess moulds, however, are discarded as waste. The waste Penicillium moulds are of no value, or have been of no value hitherto, and the growers of the moulds for antibiotic production have had some difficulty in disposing of the moulds.

It has been suggested that untreated moulds could be used as animal feedstuffs, but as the moulds are always accompanied by residual penicillins -antibiotic substances which should not be fed to animals other than for specific medicinal purposes - this use of whole moulds has not been commercially adopted to any significant extent and is in fact illegal in some countries.

The principal objects of the present invention are to provide a method of making an extract from the cells of Penicillium moulds, and an extract made by that method, such that the extract is not contaminated with residual penicillins and can be suitable for consumption by animals or in some cases by humans. Although the extracts are particularly valuable for these purposes they may also be used for other purposes, and in particular as media for the growth of moulds and other micro-organisms.

From one aspect the present invention consists in a process for making an extract from Penicillium mould which is at least substantially free from spores, which process comprises the steps of causing lysis of the constituent cells of the mould to occur to an extent such that the constituent polymers thereof are at least largely broken down to their component monomers, separating the resultant extract from gross solids such as cell debris and any undigested cell material.

From another aspect the present invention consists in an extract made by the process outlined in the last preceding paragraph.

The term Penicillium mould is used herein to denote any mould of the genus Penicillium. The Penicillium moulds most widely available as the waste products of penicillin manufacture are *Penicillium notatum*, *Penicillium chrysogenum* and *Penicillium chrysogenum notatum*. It is therefore envisaged that mainly these species will be used in carrying out the invention in view of the great similarity between the cell structure and cell constituents of the various species of Penicillium moulds, however, the invention is equally applicable to other species of the genus Penicillium. Moreover the invention is equally applicable to the production of an extract from cells of two or more species of Penicillium treated together, and the term Penicillium mould is intended to include not only cells of a single species but also a mixture of two or more species.

Penicillium moulds are normally grown commercially in conditions such that few or no spores are present. Nevertheless it is within the scope of the invention to employ Penicillium moulds grown under conditions such that spores are present in significant quantities. In such a case the spores are severed from the remainder of the mould before the extract is made.

The presence of spores tends to give rise to unpleasant "musty" or "mouldy" smells and flavours which are inappropriate for incorporation in extracts embodying the present invention. The spores may even contain poisonous principles. Nevertheless if spores are initially present in relatively small quantities their effects are small and can be further reduced as described below.

It is envisaged that the waste moulds from penicillin manufacture will constitute the main source of moulds for use in carrying out the present invention it is nevertheless within the scope of the invention to employ Penicillium moulds which have been grown specifically for the purpose of making extracts in accordance with the present invention.

If moulds are specially grown for use in carrying out the invention they are preferably grown submerged in an aqueous medium containing a source of carbohydrate and relatively small quantities of additional substances including a source of nitrogen. Such media are well known in the art and will not be described in greater detail here. Nevertheless some or all of the additional substances referred to may be present in an extract embodying the present invention, so that such an extract may be used in the growth of more Penicillium mould or in the growth of other microorganisms. Oxygen or a gas such as air which includes oxygen is passed through the aqueous medium in the usual manner.

In carrying out the process of the invention the mould is preferably separated from the aqueous medium in which it was grown, for example by filtration, and is preferably washed with water. It may then be resuspended in a relatively small amount of water or other aqueous liquid. As described in greater detail below the aqueous liquid may comprise washings from the filtered residue after extraction has been effected; alternatively or in addition it may include an extract embodying the present invention, but one which has been made without the presence of such an extract during lysis. The amount of liquid used need only be sufficient to yield a free-flowing suspension, though the yield of extract in a given time as well as the maximum yield of extract depends on the amount of liquid used.

In a modified process the mould is not resuspended directly after separation from the nutrient liquid but is dried, as for example in a ring-drier, and powdered, the powder then being suspended as outlined in the last preceding paragraph.

The suspension preferably contains between about 5 and about 20 g of mould per 100 ml of liquid.

If the mould has not been dried and powdered the suspension is preferably subjected to physical treatment which breaks the cell walls of the mould. For example the suspension may be treated in a mixer-blender which shears the cell walls.

The physical conditions are preferably adjusted so that they are particularly favourable to lysis. This may be effected solely by the various hydrolytic enzymes normally present within the cells. It is known that the autolysis of cells in favourable conditions brings about the breakdown of the constituent polymers at least largely to their component monomers. The most important reaction is the hydrolysis, by the proteolytic enzymes, of the proteins to form peptides and amino acids. Another important reaction is the breakdown of the polynucleotides to nucleotides, nucleosides and even less complex residues. The process is such that these reactions are completed to as large an extent as is reasonably possible. In addition other reactions occur; for example the carbohydrases hydrolyse the carbohydrates to sugars and the lipases hydrolyse the lipids. The fats are broken down to fatty acids.

It is extremely difficult to analyse accurately the breakdown products of cells. Nevertheless analyses have been made of the breakdown products of other types of cells by autolysis, and these demonstrate that if the conditions are comparable with those adopted in carrying out the processes characteristic of the present invention the polymers are broken down to their component monomers to a very large extent. Although accurate analyses of the products of lysis in accordance with the invention have not yet been carried out the indications are that the extent of polymer breakdown closely resembles that known to occur in similar conditions with those other types of cells.

Where the mould has been dried and powdered some of the enzymes may well have been destroyed. It is then necessary or at least desirable to add appropriate enzymes to the mixture. Even when enzymes from the moulds are already present in the mixture it may be desirable to add further enzymes, particularly proteolytic enzymes.

Pepsin is the preferred enzyme, and as this operates in acid conditions, say between a pH of 1.0 and 5.0, the pH of the mixture is preferably adjusted to the most favourable value which is normally found to be between about 3.0 and about 4.5. This may conveniently be effected by the addition of concentrated hydrochloric acid or by the addition of a mixture of concentrated hydrochloric acid and glacial acetic acid. Citric acid, either alone or with hydrochloric acid or acetic acid or both, may also be employed. It has been found that the use of acetic acid tends to increase the yield significantly, and it is thought that the presence of acetic acid enhances the enzyme activity in some way which has not yet been explained. It is generally preferred, however, to reduce the pH below a value obtainable with acetic acid alone, and for this reason it is preferred to use acetic acid and a strong acid and in particular hydrochloric acid.

Trypsin may be used as an alternative to pepsin, but as it operates in alkaline conditions it is necessary to adjust the pH accordingly.

The most suitable quantity of pepsin can best be determined by experiment, but it would normally be less than 0.5 g per 100 ml of suspension. If necessary the pepsin may be dispersed with a small quantity of wetting agent.

It is found that the added enzymes also largely remove any "musty" or "mouldy" smells although the reason for this is not understood. As indicated above such smells are normally associated with spores, and although the presence of spores is avoided as far as possible it is found in practice that a small quantity of spores is often present.

Lysis is preferably allowed to continue for a period of between six hours and seventy two hours. Throughout this period the mixture is preferably maintained at a temperature of not less than 40°C but not more than 60°C as the enzymes are normally rendered ineffective above that temperature. As the rate of lysis increases with temperature within that range it is preferred to use a temperature at the upper end of the range, and in particular a temperature of between 55° and 60°C. At these higher temperatures lysis can normally be completed in between six and eight hours.

Sporulation sometimes tends to occur during lysis. To reduce this tendency the mixture may be kept apart from air, either by being confined in a closed vessel which is filled with the mixture or by being maintained in an inert gas such as carbon dioxide.

In preferred methods the extract is separated from the cell debris, undigested cell material and any other gross solids by a centrifuging process.

The extract is preferably retained in an acid state whenever this is possible, as in its alkaline state it is particularly effective as a nutrient for micro-organisms. Thus if lysis has taken place in alkaline conditions, for example with the use of trypsin, the extract may be rendered acidic again by the addition of acids such as hydrochloric acid, citric acid and acetic acid. Further the extract may be pasteurised or sterilised to reduce any tendency to spoiling.

It has now been discovered, however, that an extract made in the manner described above may well contain a significant quantity of phenyl acetic acid. This may be present initially in association with the mould, as it is a precursor of penicillins, but in addition it is present as a breakdown product of penicillins, for the penicillins are destroyed during lysis. This hydrolytic destruction of the penicillins is effected by enzyme action, and is particularly rapid when lysis occurs in acid conditions and at temperatures approaching 60°C. Thus the process in accordance with the invention destroys penicillins associated with the moulds used as starting products and thus enables the extracts to be used as foodstuffs without the limitations resulting from the presence of penicillins.

The presence of phenyl acetic acid in the extract may be tolerable, but it tends to give rise to an unpleasant "acid" flavour in the extract, which is particularly undesirable if the extract is to be used for human consumption.

It has now been discovered that if the extract is rendered non-acidic, that is neutral or alkaline, the phenyl acetic acid tends to form a precipitate which can be separated from the extract. The precipitate is very fine and cannot normally be removed by filtration. It is therefore necessary to take special steps to separate the precipitate. If the products of lysis are left for some time, for example several hours or overnight, the precipitate tends to separate gravitationally. If the whole is cooled, for example to 5°C the precipitation is assisted. Eventually the supernatant liquid can be separated from the main bulk of the precipitate and can be finally cleared by a centrifuging process which removes any remaining precipitate.

As soon as possible after the centrifuging process the extract is preferably rendered acid again so as to prevent the growth of micro-organisms. Hydrochloric acid may for example be added to the extract to bring it back to a pH of 6.0.

Activated charcoal may then be added and a final centrifuging process carried out. Only a small quantity of charcoal need normally be used, a typical quantity being 1 lb/ton dry weight of extract. Alternatively known clarifying resins may be used instead of charcoal. This final process helps to remove any remaining "musty" or "mouldy" smell originating from spores, and also removes iron salts (both ferrous and ferric salts) which tend to potentiate any bitter flavour.

The extract may be pasteurised or sterilised at this stage instead of or in addition to the earlier pasteurisation or sterilisation.

The extract may be used without further treatment as a nutrient for the growth of micro-organisms. The extracts often contain a high proportion of amino acids, particularly lysine, which make them particularly valuable for this purpose. The extract may, for example be used with a carbohydrate such as molasses, the amount of extract employed preferably being such as to give a carbon to nitrogen ratio of approximately ten to one. The extract may well be used in place of ammonium sulphate which has been used hitherto.

Where the extract is to be used as a nitrogen and vitamin supplement or as a flavour additive for foodstuffs, further treatment is preferably carried out.

Nucleotides, or monosodium glutamate, may be added to potentiate the flavour.

Sodium chloride is preferably added to provide microbiological stabilization and also to potentiate the flavour.

The colour of the extract may be adjusted by the addition of colouring agents such as caramel.

The pH of the extract may also be adjusted, for it has been found, surprisingly, that the pH of the extract has a profound effect on the taste of the extract. A typical extract made in accordance with the invention may be relatively acid and have a pH of as little as 3.6. Such an extract is naturally rather tart to taste but is also found to have a generally "vegetable" flavour. As the pH is increased the flavour becomes progressively more "meaty" until a pH of 6.0 or 7.0 is reached. To increase the acidity it is preferred to add hydrochloric acid or actic acid or citric acid or a mixture of two or all of them. To decrease the acidity if is preferred to add sodium hydroxide.

Finally the extract may be evaporated under vacuum or can be spray-dried, pan-dried or freeze-dried to produce a liquid, pasty or dry final product as desired.

Although it is normally desirable to add sodium chloride before the extract is used, this can be added by the user. The extract may therefore have had no salt, or less than the desired quantity of salt, added to it when it is prepared for sale or use.

The extracts described above may be used much in the way that yeast extracts are used at present.

The following examples illustrate the invention. In these examples the term percentage extract is used to denote the ratio of the dry weight of the extract, before any additives have been added to it, to the dry weight of mould from which that extract was prepared, expressed as a percentage. In the examples certain substances are added in quantities expressed in terms of % w/v; this is used to denote the number of grams of substance per 100 ml of liquid or mixture to which it is added.

EXAMPLE 1

An extract was prepared from *Penicillium notatum*. The mould had been grown by submerged aerated culture and was substantially spore-free. The mycelium was relatively thick-walled, and being septate tended to break at the septa when homogenised. These factors may account for the relatively low yield of the extract.

3.2 kg of wet mycelium was suspended in distilled water to give 10% w/v solids. The dry weight was determined from a small sample of wet mycelium and was found to be 600 g. The suspension was homogenised in a Silverson mixer-blender for a period of between 5 and 15 minutes, the cells being sheared and mixed by this treatment. The pH was adjusted to 4.5 by the addition of citric acid. Sufficient bovine pepsin was added to give a concentration of 0.25% w/v. Before being added it was dispersed in a small amount of a 0.05% solution of a wetting agent called Tween 80.

The mixture was placed in a large aspirator immersed in a water bath at 50° to 55°C and the suspension was stirred continuously for three days while lysis occurred.

The undigested solid residue was removed from the resultant extract by centrifuging at 8000 r.p.m. for 10 minutes. Further clarification of the extract was achieved by filtering it through a bed of kieselguhr which had previously been washed with a fair quantity of water to remove any odour.

The filtrate was concentrated in a climbing film evaporator at a temperature not exceeding 45°C and the extract was recycled until it attained a viscous consistency. The wet weight of the concentrate was 225 g.

The total solids content of the extract was determined by measuring the specific gravity of a sample of the concentrated solution. This was about 75 g so that the percentage extract was 12.5%.

The concentrated solution was divided into two portions. One portion was evaporated on a rotary film evaporator in a water bath at 60°C under reduced pressure. The solution was concentrated until the resultant extract had a solids content of approximately 75%. This extract was suitable for use as a nutrient for fermentation processes.

The pH of the other portion was adjusted to 5.9 by the addition of a normal solution of sodium hydroxide. Sufficient salt was added to give a final salt concentration of 10% by weight. As before, liquid was evaporated on a rotary film evaporator in a water bath at 60°C under reduced pressure. Again, the solution was concentrated until the resultant extract had a solids content of approximately 75%. This extract was suitable for use as a supplement or flavour additive for foodstuffs. The taste was found to be somewhat sour, but this was probably due to the use of citric acid.

EXAMPLE 2

An extract was prepared from *Penicillium chrysogenum* in much the same manner as that used in Example 1, but concentrated hydrochloric acid was used instead of citric acid. The mycelium was thick-walled and was particularly resistant to homogenisation. This probably accounted for the low yield. 3.8 kg of wet mycelium were employed, the dry weight being 600 g. The wet weight of the extract was 620 g and the dry weight was 62 g. The percentage extract was therefore 10%. The extract had a weaker flavour that that produced by the method described in Example 1.

EXAMPLE 3

An extract was prepared from *Penicillium chrysogenum notatum*. The mould had been grown commercially for the production of penicillins and was contaminated with residual penicillins. The mould had been dried and powdered.

The powder was suspended in water at a concentration of 20 g of powder per 100 ml water. The pH was adjusted to 3.0 by the addition of hydrochloric and acetic acids, and bovine pepsin was added at 0.5 g per 100 ml of suspension. The suspension was maintained at between 55° and 60°C for 8 hours while lysis occured.

The undigested solid residue was removed by a centrifuging process. Sodium hydroxide was then added to bring the pH to 8.0, and the extract was cooled to 5°C and left overnight. A precipitate formed. The supernatant liquid was decanted and centrifuged to remove the remaining solids. Hydrochloric acid was added to bring the pH of the extract to 6.0, and a little activated charcoal was also added. The extract was again centrifuged.

Sodium chloride was added, and the extract was concentrated in a vacuum at 60°C. The extract had a "meaty" flavour and was substantially free from bitter or acid flavours.

Extracts made by the method outlined in Example 3 are particularly suitable for use as flavourings for foodstuffs. If they are in liquid form the salt content may be adjusted to about 12% and they may be suitable for use as flavour additives for soups. If they are concentrated further so as to be in the form of dry pastes the salt content may be made as high as 40%. Such pastes are suitable for use in confectionary items. The extracts may also be formed as dry powders, again with a relatively high salt content, and in this form may be added to meat pies and soup mixes.

Instead of being used for the purposes mentioned above, extracts made by the methods outlined above may be used as preliminary extracts in the production of further extracts will hereinafter be called second or final extracts. In particular a preliminary extract may be made by causing lysis of a first portion of Penicillium mould, and a final extract then being made from a second portion of Penicillium mould by lysis of the constituent cells while they are in contact with the preliminary extract.

Preferably the preliminary extract is separated from the cell debris, undigested cell material and any other gross solids before it is brought into contact with the second portion of the mould.

The second portion of mould may be dried and powdered, or otherwise treated, before being brought into contact with the preliminary extract.

The mould used in the production of the preliminary extract would normally be the same as the mould used in the production of the final extract, but that is not essential.

The processes described in the first part of this specification and resulting in the production of what is now referred to as preliminary extracts include processes in which the solids separated from the extract are washed with water and yield washings containing additional extracted material. The washings may be either added to the extract itself or used as the medium in which to suspend powdered mould in the preparation of a further extract. When the washings are used in the latter manner, that is as a medium in which to suspend powdered mould in the preparation of a further extract, it is found that the yield of said further extract may be somewhat greater than is the case when water alone is used as the medium but that is not always the case.

The characteristic feature of the method involving the preparation of preliminary and final extracts is the use of the extract itself, rather than the washings, as the medium in which to suspend mould used in the preparation of the final extract. Surprisingly it has been found that the yield of the second, or final, extract is considerably greater than might have been expected from the experience previously gained with the use of washings. Further, and yet more surprisingly, is the discovery that if the final extract is used as the medium in which to suspend yet more mould in the preparation of a third extract the yield of that third extract is very much less than the comparable yield of the "final" or second extract.

In view of the reduction in yield when a third extract is used the process does not lend itself to a single continuous extraction process in which a part of the extract from a mould is used in an earlier stage in the same process to suspend more mould. The invention is therefore normally carried out as two separate processes; either process or each process may be a batch process or a continuous or semi-continuous process.

The preliminary extract may be made by any of the methods described in the earlier part of this specification.

One advantage of the process is the increase in yield. Another advantage of the two-stage process is that it can be used to make final extracts which have a higher percentage of solids, that is are stronger, than comparable extracts made by the single-stage process described above method. It is normally desirable to remove a considerable proportion of the water from an extract before the extract is used, and the removal of water, usually by evaporation, often adds appreciably to the cost of the production of the extract. The fact that the final extracts made by the method of the present invention are usually stronger than those produced by the previous method is therefore a particular advantage.

In the preparation of the final extract the methods employed are preferably similar to those outlined above with reference to the preparation of the preliminary extracts, with the exception that lysis of the second portion of mould occurs in the presence of the preliminary extract.

For example, when the mould for the final extract has been grown by submerged aerated culture it is preferably separated from the nutrient liquid in which it was grown, as by filtration, and is preferably washed. It may then be resuspended in a small amount of the preliminary extract to give a free-flowing suspension. In a preferred modification, however, the mould for the final extract is not resuspended directly after separation from the nutrient liquid but is dried, as for example in a ring-drier, and powdered, the powder then being suspended in the preliminary extract.

The process may then continue in a manner similar to the process outlined above for the preparation of the preliminary extract. As with the preliminary extract it is desirable for the final extract to be acid, and therefore where enzymes are used it is preferred to use enzymes which require acid conditions.

It must be emphasized that although it is preferred to use a process for the preparation of the final extract from a second portion of mould which is similar to the process used for the preparation of the preliminary extract from a first portion of mould, this is by no means essential, and in some circumstances it may be found desirable to employ one type of process in the production of the preliminary extract and another type of process in the production of the final extract.

The final extract may be used without further treatment as a nutrient for the growth of micro-organisms.

Where the final extract is to be used as a nitrogen and vitamin supplement or as a flavour additive for foodstuffs, further treatment is preferably carried out. The further treatment may comprise any of those treatments outlined above in connection with the extract made by the single-stage process.

There will now be described by way of example one particular group of experiments illustrating the two-stage process. In these experiments use was made of powdered mould of the species Penicillium chrysogenum notatum.

Four experiments were carried out:

A. 1000 g mould powder were mixed with 4 l water, 125 ml acid and 5 g pepsin. Lysis was allowed to occur. The resulting mixture was centrifuged and the resultant solids were set aside. The liquid from which the solids had been removed constituted the preliminary extract. There were 2020 ml of that preliminary extract, and they contained 7.29% solids in solution or suspension, i.e. 147.3 g. The solids separated by the centrifuging process were washed with 1.5 l water, and the resulting mixture was centrifuged. The solids were discarded. The liquid, of which there were 1782 ml, was found to contain 4.16% solids in solution or suspension, i.e., 74.1 g.

The preliminary extract and the washings together thus contained 147.3 + 74.1 = 221.4 g solids or suspension. This total amount of usable material extracted constituted 22.1% of the weight of the mould powder used.

B. 100 g mould powder were mixed with 400 g of washings from experiment A, 17 ml acid and 0.5 g pepsin. 125 ml water were also added as the mixture was insufficiently liquid in consistency. After lysis the mixture was centrifuged, and produced 210 ml liquid extract containing 9.1% solids in solution and suspension, i.e., 19.1 g. The solids from the centrifuging process were washed with 300 ml water and again centrifuged. The resulting solids were discarded; the washings, of which there were 295 ml, were found to contain 4.92% solids in solution and suspension, i.e., 14.5 g. The extract and washings together thus contained 19.1 + 14.5 = 33.6 g solids. As the original mixture contained 400 g of washings from experiment A, i.e., 16.6 g solids, the solids extracted from the 100 g mould powder only amounted to 33,6 − 16.6 = 17.0 g, that is 17% of the weight of the mould powder used.

Although the rate of extraction was rather less than that achieved in experiment A the concentration of solids in the final mixture of extract and washings was greater than that in the mixture obtained in experiment A. It is normally desirable to concentrate the final mixtures to a predetermined strength; and it will be appreciated that the mixture obtained from experiment B requires less concentration than that obtained from experiment A. As the cost of effecting concentration is relatively high, and the cost of the mould powder relatively low, it may well be possible to produce a concentrated product more cheaply by using a process exemplified by experiment B than a proceed exemplified by experiment A.

C. 200 g mould powder were mixed with 800 g of the preliminary extract produced in experiment A, 20 ml acid and 1 g pepsin. After lysis the mixture was centrifuged and produced 405 ml liquid extract (i.e., "final extract") containing 22.9% solids in solution and suspension, i.e., 92.7 g. The solids from the centrifuging process were washed with 400 ml water and the resulting mixture was centrifuged. The solids were discarded, and the washings of which there were 340 ml, were found to contain 6.65% solids in solution and suspension, i.e., 22.6 g. The total solids in the extract and washings thus amounted to 92.7 + 22.6 = 115.3 g solids. As 800 g of preliminary extract were added initially, containing 58.3 g solids, the weight of solids extracted from the 200 g mould powder was 115.3 − 58.3 = 57.0 g, i.e., 28.5%. This is considerably more than that obtained in either experiment A or experiment B, and exemplifies the improvement obtained by using the two-stage process.

D. 100 g mould powder were mixed with 400 g liquid extract obtained in experiment C, 20 ml acid and 0.5 g pepsin. As the consistency of the mixture was insufficiently liquid 200 ml water were added. After lysis the mixture was centrifuged, giving 230 ml of a liquid extract containing 15.08% solids in solution and suspension, i.e., 34.7 g. The solids from the centrifuging process were washed with 200 ml water and the resultant mixture was centtrifuged. The solids were discarded. The liquid washings, of which there were 205 ml were found to contain 9.2% solids in solution and suspension, i.e., 18.9 g. Thus the total weight of solids in the extract and washings was 34.7 + 18.9 = 53.6 g. But the 400 g of liquid extract added initially contained 91.6 g solids so that 38.0 g solids were actually lost during this experiment.

The experiment thus demonstrates that use of a three-stage method, far from maintaining or improving the extraction rate, actually results in the loss of extract.

The interpretation of the results of the experiment described above is based on a comparison between the weight of solids in the extracts combined with the weight of solids in the washings. It may also be valuable to interpret the results by comparing the weights of solids in the extracts alone. Thus in experiment A the preliminary extract contained 147.3 g solids, i.e., 14.7% of the weight of mould powder. In experiment B the liquid extract contained 19.1 g solids, but as 16.6 g had already been added in the washings from experiment A the net weight of solids attributable to the 100 g mould powder was only 19.1 − 16.6 = 2.5 g, i.e., 2.5%. In experiment C on the other hand the "final extract" contained 92.7 g solids; and although 58.3 g had been added in the preliminary extract the net weight of solids attributable to the 200 g mould powder is 92.7 − 48.3 = 34.4 g, i.e., 17.2% -an improvement on either experiment A or experiment B. Experiment D resulted in a loss of solids and need not be considered further.

I claim:

1. A process for making an extract from Penicillium mould which is at least substantially free from spores, which process comprises the steps of causing lysis under acid conditions of the constituents cells of the mould to occur to an extent such that the constituent polymers thereof are at least largely broken down to their component monomers, separating the resultant extract from gross solids such as cell debris and any undigesged cell material, rendering the separated extract non-acidic whereby phenyl acetic acid present is caused to form a precipitate, and separating the precipitate from the extract.

2. A process according to claim 1 in which lysis of additional penicillium mould is caused to occur in the presence of a preliminary extract made from penicillium mould by the process of claim 1.

3. A process according to claim 1 in which the extract is cooled to assist precipitation of the phenyl acetic acid.

4. A process according to claim 1 in which lysis is effected in acid conditions, and in the presence of pepsin.

5. A process according to claim 4 in which the pH during lysis is between 1.0 and 5.0.

6. A process according to claim 5 in whcih the pH during lysis is between 3.0 and 4.5.

7. A process according to claim 4 in which the acid conditions are at least partly brought about by the addition of acetic acid.

8. A process according to claim 1 in which the pH of the extract is adjusted to a selected value between 3.6 and 7.0 after separation from the solids.

9. A process according to claim 8 in which the pH is brought to the desired value by the addition of a substance selected from the group comprising, hydrochloric acid, acetic acid and citric acid.

* * * * *